United States Patent
Neville

(10) Patent No.: US 9,884,727 B1
(45) Date of Patent: Feb. 6, 2018

(54) DIVERTER WITH ROLLER PUSHERS

(71) Applicant: Laitram, L.L.C., Harahan, LA (US)

(72) Inventor: Alexandra L. Neville, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/375,446

(22) Filed: Dec. 12, 2016

(51) Int. Cl.
*B65G 25/00* (2006.01)
*B65G 25/08* (2006.01)
*B65G 47/84* (2006.01)

(52) U.S. Cl.
CPC ........... *B65G 25/08* (2013.01); *B65G 47/844* (2013.01)

(58) Field of Classification Search
CPC ........................... B65G 47/841; B65G 47/844
USPC .................... 198/890, 890.1, 370.02, 370.03
See application file for complete search history.

(56) References Cited

U.S. PATENT DOCUMENTS

| | | |
|---|---|---|
| 2,868,394 A | 1/1959 | Greller et al. |
| 4,283,245 A | 8/1981 | Benoit |
| 4,732,260 A | 3/1988 | Canziani |
| 5,038,912 A | 8/1991 | Cotter |
| 5,127,510 A | 7/1992 | Cotter et al. |
| 5,167,315 A | 12/1992 | Doane |
| 5,333,715 A | 8/1994 | Sapp |
| 5,909,797 A | 6/1999 | Van Den Goor |
| 5,921,378 A | 7/1999 | Bonnet |
| 5,950,798 A | 9/1999 | Bonnet |
| 5,967,289 A | 10/1999 | Kelsey |
| 5,971,132 A | 10/1999 | Bonnet |
| 6,041,909 A | 3/2000 | Shearer, Jr. |
| 6,044,956 A | 4/2000 | Henson et al. |
| 6,702,106 B1 | 3/2004 | Sweazy |
| 6,705,452 B2 | 3/2004 | Greve et al. |
| 6,802,412 B2 | 10/2004 | Lapeyre et al. |
| 6,923,308 B2 | 8/2005 | Veit |
| 6,974,019 B2 | 12/2005 | Lapeyre et al. |
| 7,021,452 B2 | 4/2006 | Horton et al. |
| 7,628,265 B2 | 12/2009 | Verploegen et al. |
| 8,770,379 B2 | 7/2014 | Van Den Goor et al. |
| 8,776,993 B2 * | 7/2014 | Umeda ................ B65G 19/245 198/370.02 |
| 8,985,304 B2 | 3/2015 | Guernsey et al. |
| 9,302,855 B2 | 4/2016 | Guernsey et al. |
| 9,399,558 B2 * | 7/2016 | Guernsey ............. B65G 47/844 |
| 9,452,896 B2 | 9/2016 | Lee |
| 2014/0332342 A1 * | 11/2014 | Guernsey ............. B65G 47/844 198/370.07 |

FOREIGN PATENT DOCUMENTS

| | | |
|---|---|---|
| JP | 2000344323 A | 12/2000 |
| WO | 2014011478 A1 | 1/2014 |

\* cited by examiner

*Primary Examiner* — William R Harp
(74) *Attorney, Agent, or Firm* — James T. Cronvich

(57) ABSTRACT

A diverter belt having translatable pushers with article-contacting rollers to push articles across the belt. Cam followers on the pushers follow guides under the belt along an upper carryway run to translate the pushers across the width of the belt along one or more transverse tracks.

14 Claims, 4 Drawing Sheets

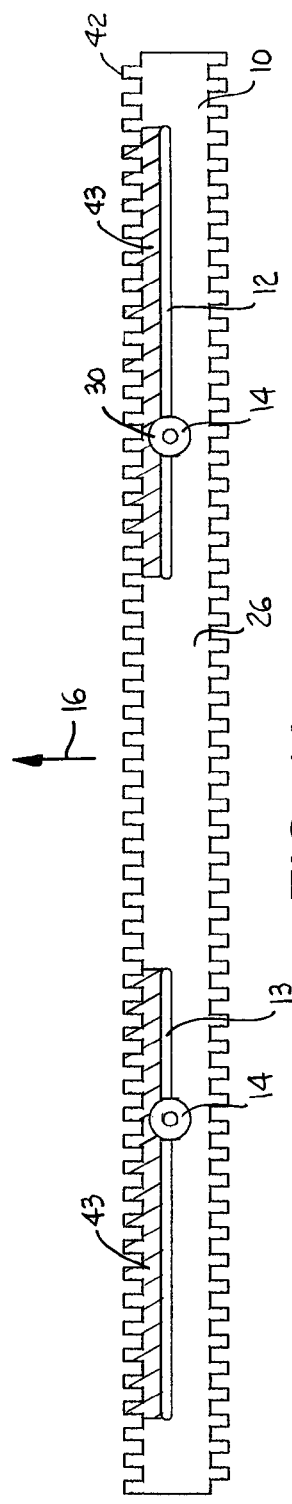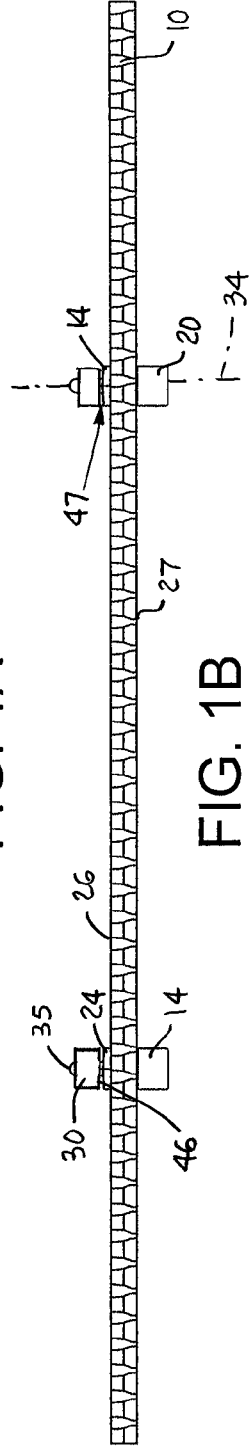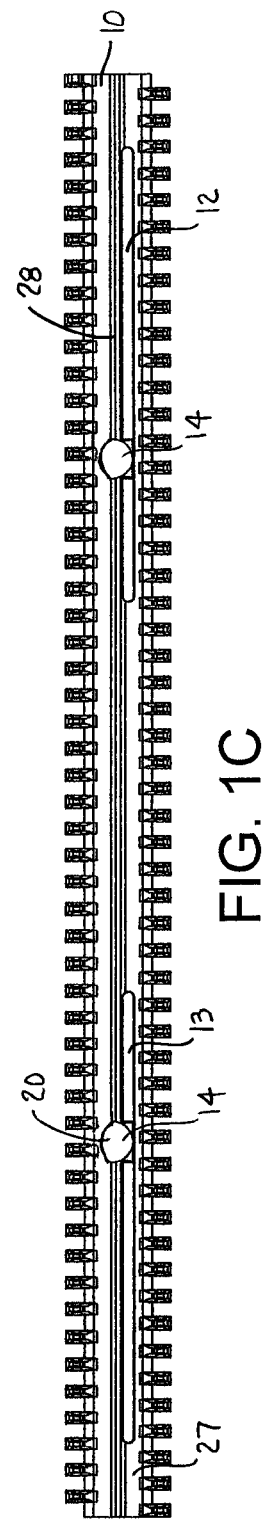

DIVERTER WITH ROLLER PUSHERS

BACKGROUND

The invention relates generally to power-driven conveyors and more particularly to pusher-type diverters.

Article diverters, such as shoe sorters, are used to translate articles across the width of a conveyor as the conveyor transports the articles in a conveying direction. Typical shoe sorters include shoes, or pushers, that are driven laterally across the conveyor to push articles off one or both sides of the conveyor to one or more outfeed locations. In other article-diverting conveyors, the laterally driven pushers can be used to merge articles to the center of the conveyor and into alignment. Slat conveyors and modular conveyor belts are used as platforms for the pushers, which ride in tracks extending across the widths of the slats or belt modules. The pushers have depending structural elements that keep the pushers in the track or extend below to engage carryway guides that control the lateral positions of the pushers. The pushers are often ramped or have concavely curved lower skirts up which articles can ride when contacted by the pushers as they are driven along the track. In some cases the articles can ride up and over the pushers and not be aligned as required.

SUMMARY

One version of a conveyor belt embodying features of the invention comprises a top surface and an opposite bottom surface and a plurality of tracks extending across the conveyor belt. Pushers, which have article-contacting rollers above the top surface of the conveyor belt, are arranged to move along the tracks.

One version of a conveyor embodying features of the invention comprises a conveyor belt advanceable along an upper carryway run in a conveying direction and a diverter disposed below the bottom surface of the conveyor belt along the carryway run. The conveyor belt includes a top surface and an opposite bottom surface and a plurality of elongated tracks spaced apart in the conveying direction and extending across the conveyor belt. Pushers are arranged to translate along the elongated tracks. The pushers include cam followers that extend below the bottom surface and freely rotatable article-contacting rollers that extend above the top surface. The diverter has a guide surface contacting the cam followers to translate the pushers across the conveyor belt as it advances in the conveying direction.

BRIEF DESCRIPTION OF THE DRAWINGS

FIGS. 1A-1C are, respectively, top, front elevation, and bottom views of a roller-pusher diverter belt module embodying features of the invention, including left- and right-hand slots with a pusher in each;

DETAILED DESCRIPTION

Figure 2A:
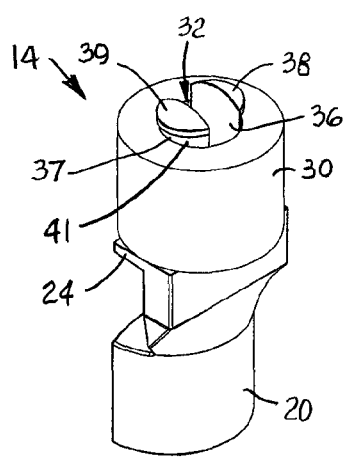
FIGS. 2A-2D are, respectively, isometric, side elevation, front elevation, and top plan views of one version of a snap-in roller pusher for a diverter belt module as in FIGS. 1A-1C.
Figure 2B:
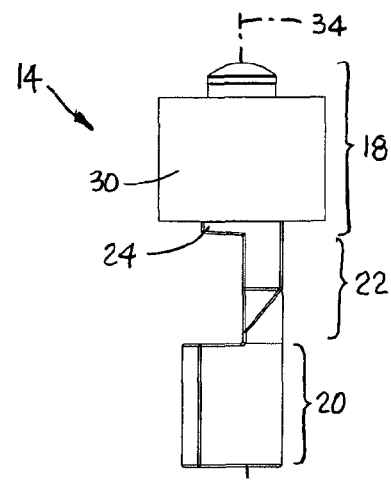
Figure 2C:
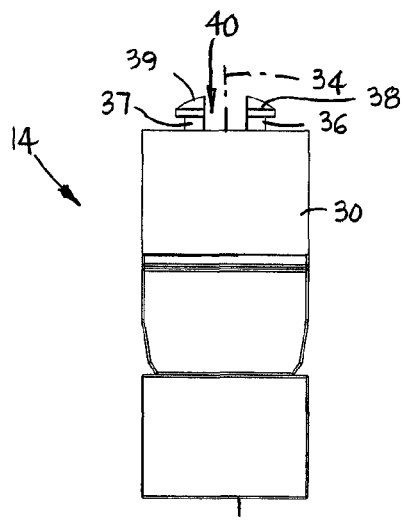
Figure 2D:
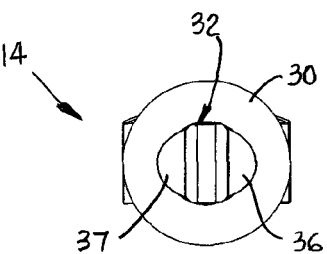

One version of a pusher module for a conveyor belt is shown in FIGS. 1A-C. The module 10 has two transverse tracks in the form of elongated slots 12, 13 that extend through the thickness of the module. A pusher 14 translates along the length of each slot. The slots 12, 13 in this example are shown aligned, of the same length, and elongated in the width direction of the module 10. But the slots could be offset from each other in the conveying direction 16 and could be of different lengths. Or a module could be made with a single slot or more than two slots.

The pusher 14, as also shown in FIGS. 2A-D and 3, has an upper axle portion 18 and a lower cam follower portion 20 joined by an intermediate shank portion 22. The upper axle portion 18 extends from a shoulder 24 that slides along the top conveying surface 26 of the module 10. The narrow shank portion 22 extends through the slot 12, 13. The lower cam follower portion 20 rides along the slot just below the bottom of the module's drive bar 28. A roller 30 is rotatably mounted on the axle portion 18 received in a central bore 32 of the roller. The axle portion 18 defines a vertical axis 34 of rotation for the roller 30. The axle portion 18 comprises a pair of prongs 36, 37 extending upward from the shoulder 24 at a proximal end to distal domed tabs 38, 39 with a maximum outer dimension greater than a maximum outer dimension of the prongs 36, 37 in a cross section perpendicular to the vertical axis 34. The outer diameter of the distal domed tabs 38, 39 is greater than that of the central bore 32 to retain the roller 30 on the pusher 14. The prongs 36, 37 are separated across a slot 40. Together, the two prongs 36, 37 form a flexible split axle 35 that allows the roller 30 to be snapped in place and easily removed. The pairs of prongs 38, 39 in this example have half-moon cross sections with facing flat faces and outer circular curved bearing surfaces 41 on which the roller 30 rides. The outer bearing surfaces 41 of the two prongs 36, 37 lie on the same imaginary circular cylinder when the prongs are unflexed.

Figure 3:
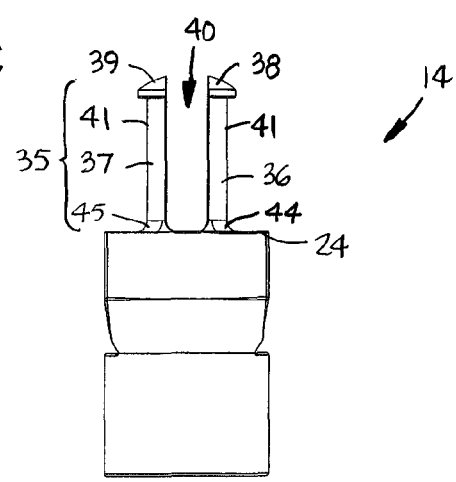
FIG. 3 is an elevation view of the pusher of FIGS. 2A-2D without the roller.

As shown in FIG. 3, the proximal bases of the prongs 36, 37 have slight bottom skirts 44, 45 that taper concavely from the outer bearing surfaces 41 to the shoulder 24 of the pusher 14. The widening skirts 44, 45 elevate the roller 30 slightly above the shoulder 24 across a space 47 to eliminate frictional contact between the shoulder 24 and the bottom side face 46 of the roller, as shown in FIGS. 1B and 4B. On insertion of the split axle 35 into the roller's bore 32, the domed tabs 38, 39 are pushed toward each other into the intervening space 40 enough to enter the bore. The compressed split axle 35 is pushed through the bore 32 until the tabs exit the other end of the bore. The tabs 38, 39 spring outward by snap action upon clearing the bore 32 and retain the roller 30 in place on the relaxed split axle 35. The roller 30 is easily removed by manually compressing the split axle 35 by pushing the two tabs 38, 39 toward each other until they fit in the bore 32. Once the tabs 38, 39 are in the bore 32, the roller 30 can be slid off the split axle 35.

The pusher 14 less the roller 30 in this example is realized as a monolithic element homogeneously formed as a single piece by molding, for example. The height of the shank 22 is slightly greater than the thickness of the module 10 at the slot 12, 13. The outer dimensions of the pusher 14 slightly above the top conveying surface 26 and slightly below the bottom surface 27 of the module are slightly greater than the width of the slot—enough to retain the pusher in the slot.

The narrow portion 43 of the plastic module 10 between the slots 12, 13 and the first end 42 and shown hatched in FIG. 1A is flexed upward or downward to temporarily widen the slots to admit the pusher into place. Once the pusher 14 is in place, the narrow portion 43 is released, and the module 10 returns to its natural relaxed state retaining the pusher. Then the roller 30 can be snapped in place on the split axle 35.

Figure 4A:
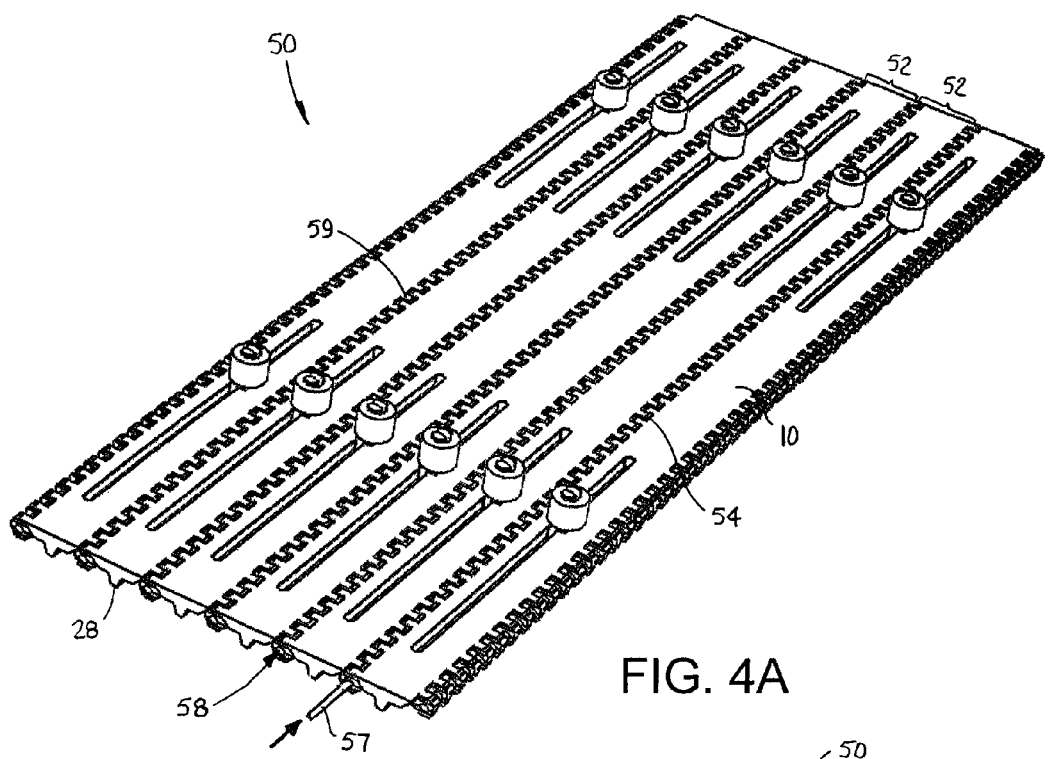
FIGS. 4A and 4B are perspective and side elevation views of a diverter belt constructed of belt modules as in FIGS. 1A-1C.
Figure 4B:
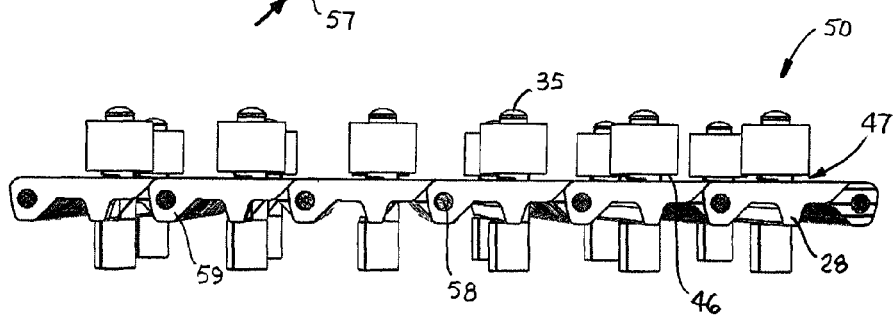

A portion of a diverter belt is shown in FIGS. 4A and 4B. The belt 50 is constructed of rows 52 of belt modules 10 connected end to end at hinge joints 54 by hinge rods 57 received in aligned rod holes 58 through interleaved hinge elements 59 of adjacent belt rows. The belt 50 is driven by a female sprocket (not shown) with gullets receiving the belt's drive bars 28. Although the belt 50 is shown with a single module 10 in each row 52, a belt could be constructed of more than one module per row.

Figure 5A:
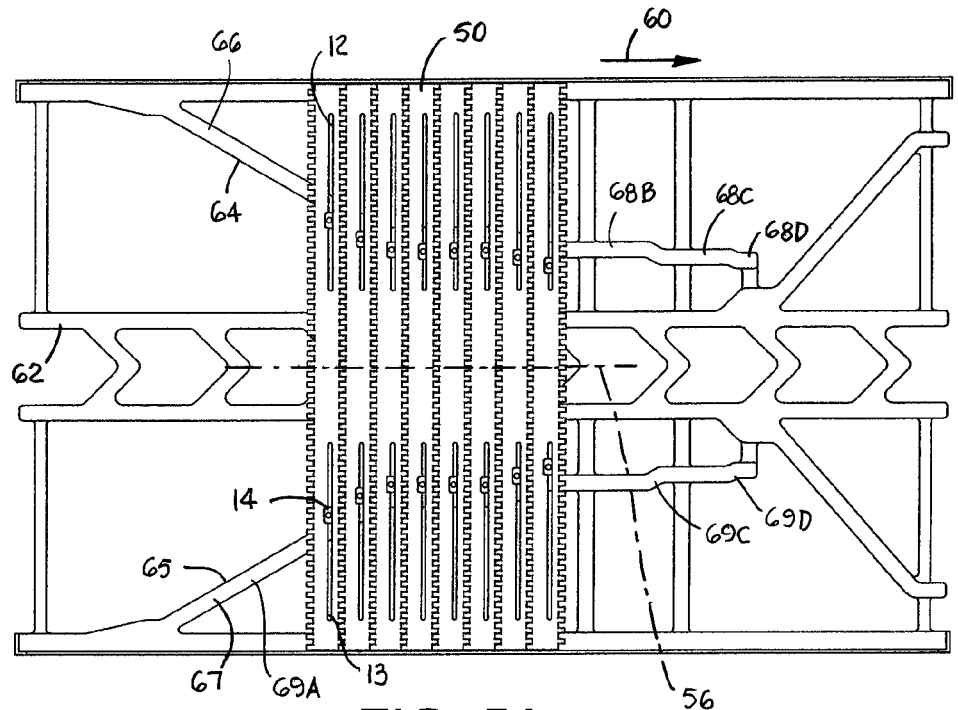
FIG. 5A is a top plan view of a portion of the diverter belt of FIGS. 4A and 4B being guided by a diverting guide.
Figure 5B:
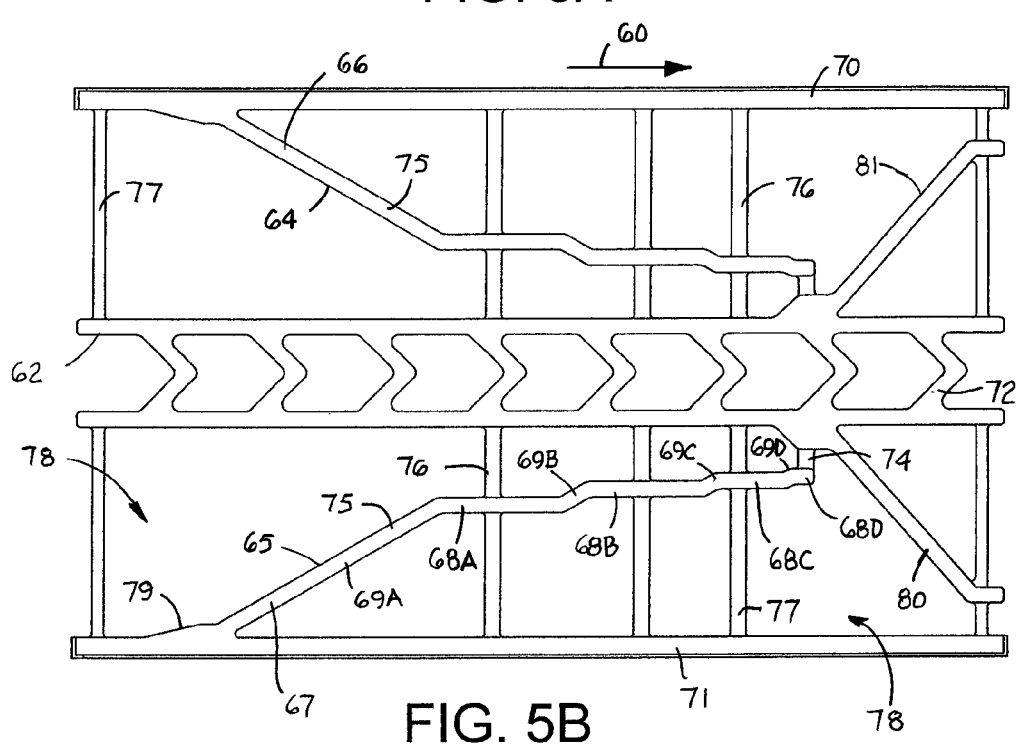
FIG. 5B is a top plan view of the diverting guide with the diverter belt removed for clarity.

One example of a diverting unit usable with the diverter belt 50 is shown in FIGS. 5A and 5B. The pushers 14 are translated as the belt 50 advances in the conveying direction 60 by a diverter unit 62 disposed below the conveyor belt and supported in the conveyor frame. In this example the diverter unit 62 includes two vertical guide surfaces 64, 65 on guide members 66, 67. The guide members 66, 67 are mirror images of each other about the centerline 56 of the belt 50. Each of the guide surfaces 64, 65 is stepped with four parallel segments 68A-D extending in the conveying direction 60 joined to each other and to side rails 70, 71 by oblique segments 69A-D. The downstream-most parallel segment 68D is connected to a central beam 72 by a cross link 74. The guide unit 62 is strengthened by cross members 76. The entire diverter unit 62 may be molded or machined as a single monolithic piece to avoid crevices at joints that could harbor bacteria, dirt, and other contaminants and to eliminate snag points that could form at misaligned joints in a multi-piece design. In this example, the top surfaces 75 of the guide members 66, 67, the side rails 70, 71, the oblique segments 69A-D, and the central beam 72 are coplanar. The top surfaces 77 of the cross members 76 and the cross links 74 are recessed at a level far enough below the plane of the top surfaces 75 of the guide members, the side rails, the oblique segments, and the central beam to avoid snagging the underside cam followers on the pushers. Other surfaces 79, 81 on the diverter unit are oriented oblique to the conveying direction to avoid snagging. The coplanarity of the top surfaces 75 provides for lower-pressure contact with the cam followers and allows the diverter unit 62 to serve as the carryway supporting the belt 50. The diverter unit 62 could alternatively be divided into two monolithic halves about the centerline 56 of the belt. Or the guide members, the side rails, the oblique members, the central beam, and the cross members could be manufactured as separate pieces held together by tie rods to ensure coplanarity of the top surfaces. The central beam 72 of the diverter unit 62 is further shown with generous openings 78 for easier drainage and cleaning, as well as for reduced weight.

As shown in FIG. 5A, the diverter unit 62 is used to center conveyed articles on the conveyor belt 50. Before encountering the diverter 62, the pushers 14 are typically positioned at home positions near the outside ends of the slots 12, 13. As the pushers 14 encounter the first and longest oblique guide segments 69A, they are moved a majority of the distance toward the centerline 56 of the belt 50, but the orientation of the articles is skewed by the obliquely arranged pushers. Along the longer parallel segments 68A-C, the pushers 14 are aligned in the conveying direction 60. Each consecutive parallel segment 68B-D downstream is closer to the centerline 56. Each consecutive oblique diverting segment 69 B-D downstream is shorter in length and diverts a lesser distance inward. The stepped guide surfaces tend to bump conveyed articles, such as rectangular packages, straight, out of skew. Operating the pushers 14 to follow a stepped guide path, rather than a continuously curved guide path, centers conveyed articles while maintaining their original orientations. Downstream of the stepped centering portion, the diverter 62 has a pair of reset guides 80 that guide the pushers 14 back to their home positions near the outside ends of the slots 12, 13.

Although the only one version of the roller pusher was described in detail, other versions are possible. For example, a one-piece axle with an enlarged roller-retaining head could be used instead of the split axle. The enlarged head could be unitarily formed as part of the axle or could be a separate piece that snaps or screws into a cavity at the distal top end of the one-piece axle to permit replacement of the roller. Other structures for retaining the roller are also possible. And although the roller pusher was shown in a modular conveyor belt, it could also be used in other kinds of diverter belts, such as slat conveyors. And the diverter belt could be used with diverter units other than the exemplary one shown in FIGS. 5A and 5B.

What is claimed is:

1. A conveyor belt comprising:
   a top surface and an opposite bottom surface;
   a plurality of tracks extending across the conveyor belt;
   a plurality of pushers arranged to move along the tracks;
   wherein the pushers have article-contacting rollers above the top surface of the conveyor belt;
   wherein each of the pushers includes an axle extending outward of the top surface and received in a bore in one of the rollers; and
   wherein the axle has a curved outer surface that tapers concavely to the top surface of the conveyor belt to prevent the roller from contacting the top surface.

2. A conveyor belt as in claim 1 wherein the axle defines a vertical axis of rotation for the roller.

3. A conveyor belt as in claim 1 wherein each of the pushers includes a shoulder above the top surface of the conveyor belt and wherein the axle includes a pair of prongs extending from the shoulder away from the top surface and separated across a space.

4. A conveyor belt as in claim 3 wherein each of the prongs has an enlarged domed tab distal from the shoulder.

5. A conveyor belt as in claim 1 wherein each of the pushers includes a pair of prongs having flat faces facing each other across a space and curved outer surfaces both lying on an imaginary circular cylinder.

6. A conveyor belt as in claim 1 comprising a plurality of rows of belt modules hingedly linked together, wherein at least some of the rows of belt modules include at least one of the tracks.

7. A conveyor belt as in claim 1 wherein the pusher is monolithic and wherein the tracks are formed by elongated slots extending through the thickness of the conveyor belt from the top surface to the bottom surface and wherein the conveyor belt is flexible enough to allow the monolithic pusher with the roller removed to be installed in the elongated slot by flexing the belt module at the elongated slot to temporarily widen the elongated slot to admit the monolithic pusher without the roller into place.

8. A conveyor comprising:
   a conveyor belt advanceable along an upper carryway run in a conveying direction and including:
      a top surface and an opposite bottom surface;

a plurality of elongated tracks spaced apart in the conveying direction and extending across the conveyor belt; and a plurality of pushers arranged to translate along the elongated tracks, wherein the pushers include cam followers extending below the bottom surface and freely rotatable article-contacting rollers extending above the top surface;

wherein each of the pushers includes an axle extending outward of the top surface and received in a bore in one of the rollers;

wherein the axle has a curved outer surface that tapers concavely to the top surface of the conveyor belt to prevent the roller from contacting the top surface;

a diverter disposed below the bottom surface of the conveyor belt along the carryway run and having a guide surface contacting the cam followers to translate the pushers across the conveyor belt as it advances in the conveying direction.

9. A conveyor as in claim 8 wherein the axle defines a vertical axis of rotation for the roller.

10. A conveyor as in claim 8 wherein each of the pushers includes a shoulder above the top surface of the conveyor belt and wherein the axle includes a pair of prongs extending from the shoulder away from the top surface and separated across a space.

11. A conveyor as in claim 10 wherein each of the prongs has an enlarged domed tab distal from the shoulder.

12. A conveyor as in claim 8 wherein each of the pushers includes a pair of prongs having flat faces facing each other across a space and curved outer surfaces both lying on an imaginary circular cylinder.

13. A conveyor as in claim 8 comprising a plurality of rows of belt modules hingedly linked together, wherein at least some of the rows of belt modules include at least one of the tracks.

14. A conveyor as in claim 8 wherein the pusher is monolithic and wherein the tracks are formed by elongated slots extending through the thickness of the conveyor belt from the top surface to the bottom surface and wherein the conveyor belt is flexible enough to allow the monolithic pusher with the roller removed to be installed in the elongated slot by flexing the conveyor belt at the elongated slot to temporarily widen the elongated slot to admit the monolithic pusher without the roller into place.

\* \* \* \* \*